June 27, 1933.　　　F. E. ROSHNELL　　　1,915,802
PORTABLE CAMERA STAND
Filed July 11, 1931　　　2 Sheets-Sheet 1
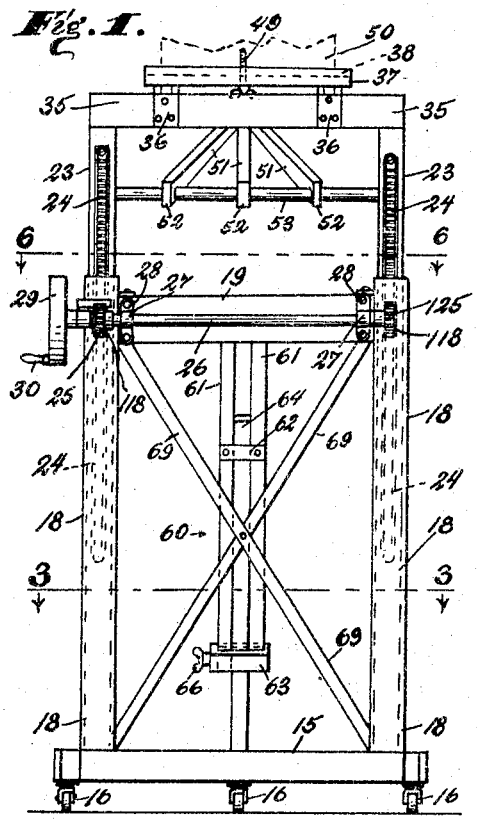
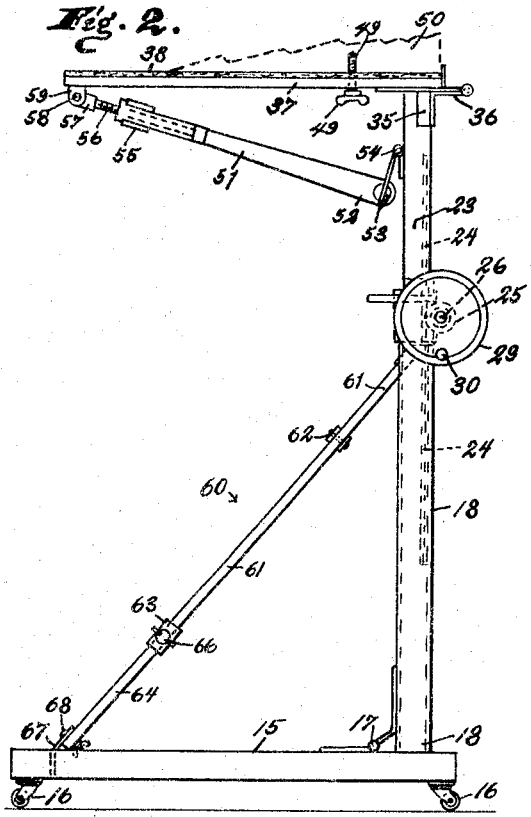
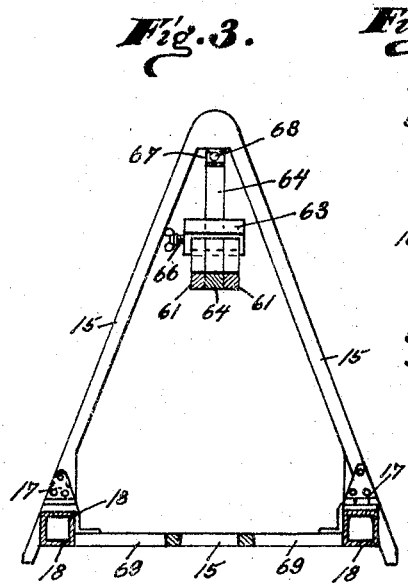
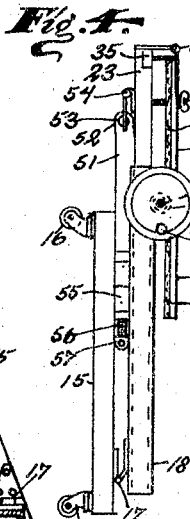
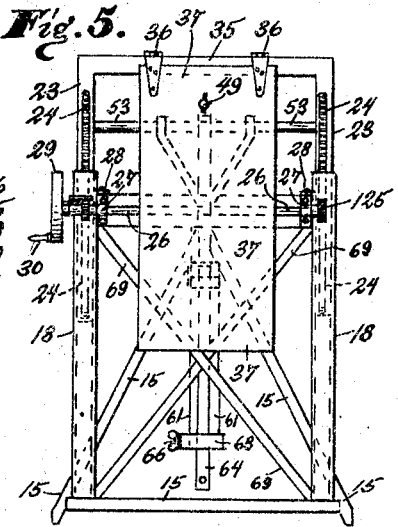
Inventor.
Frank E. Roshnell.
By
Lockwood & Lockwood,
His Attorneys.

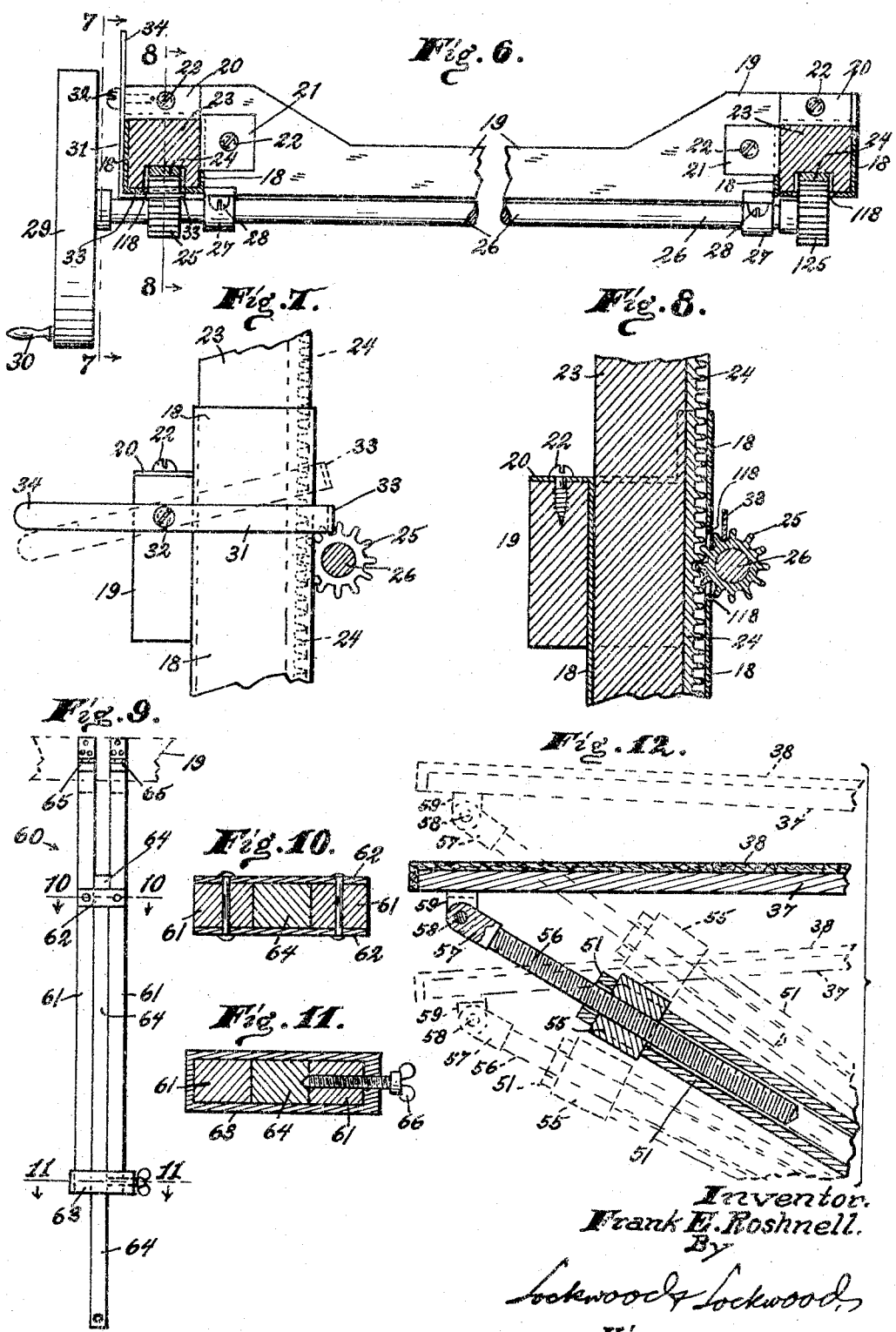

Patented June 27, 1933

1,915,802

UNITED STATES PATENT OFFICE

FRANK E. ROSHNELL, OF LOS ANGELES, CALIFORNIA

PORTABLE CAMERA STAND

Application filed July 11, 1931. Serial No. 550,171.

This invention relates to an apparatus for use in photography and the principal object is to provide a collapsible, transportable and adjustable support for a camera that is constructed to avoid vibration when the camera is operated. To that end I provide a camera stand formed mainly of relatively light but strong material constructed rigidly so that vibration, when the camera is in operation, is practically avoided. As is well known, a camera lens must not be vibrated but held in a fixed position or moved steadily in an arc to obtain satisfactory results in photography and, as stated, an object of this invention is to provide a camera stand for that purpose.

Another object of the invention is to provide a camera stand that is easily adjustable relative to elevations at which the camera is to be operated with means for positively holding it in adjusted position. To that end I provide a hand wheel at the side of the stand for raising and lowering the moving members of telescoping posts with a latch adjacent the hand wheel for holding the parts in adjusted position.

A feature of invention is shown in the construction, combination and arrangement of the parts whereby a camera stand is provided that is highly adjustable and adapted to all camera supporting purposes but which also is collapsible so it can be folded into a very small space for transportation.

Other objects, advantages and features of invention may appear from the accompanying drawings, the subjoined detailed description and the appended claims.

The accompanying drawings illustrate the invention, in which:

Figure 1 is a front elevation of a camera stand constructed in accordance with this invention and fragmentally indicating by dotted lines a camera mounted on the platform.

Fig. 2 is a side elevation of the camera stand.

Fig. 3 is a cross section on line 3—3, Fig. 1, showing a plan view of the triangular base.

Fig. 4 shows a side view of the camera stand collapsed and folded ready for transportation.

Fig. 5 is a front view of the stand when collapsed and folded.

Fig. 6 is an enlarged fragmental cross section on line 6—6, Fig. 1, showing a detail of the means for raising and lowering the platform; and also showing a latch for holding it in adjusted position.

Fig. 7 is an enlarged fragmental section on line 7—7, Fig. 6, showing by full lines a side view of the latch engaging the teeth of the latch gear; and by dotted lines showing the latch in disengaged position.

Fig. 8 is another enlarged fragmental section on line 8—8, Fig. 6, showing the teeth of one of the adjusting gears in mesh with the teeth of one of the rack bars.

Fig. 9 is a bottom view of the lower brace showing it adjustable for the purpose of holding the posts erect when in use, and also for the purpose of shortening it when the stand is to be collapsed and folded.

Fig. 10 is an enlarged cross section on line 10—10, Fig. 9.

Fig. 11 is another enlarged cross section on the line 11—11, Fig. 9, showing the clamp screw and frame for securing the slide bar braces in proper adjusted position.

Fig. 12 is an enlarged fragmental section through the rear end portion of the camera platform showing the hand screw for tilting the platform and indicating by dotted lines two tilted positions of the platform.

In the drawings many of the parts are shown semi-diagrammatically.

The camera stand includes a triangular skeleton base 15 that is mounted on caster wheels 16 so the stand can be easily moved from place to place or quickly turned in arcs in either direction to properly locate it when in use and the castor wheels are arranged at the corners of the triangular base so they very firmly support the stand.

Span hinges 17 are secured on the top side of the base and also to the bottom ends of the hollow metal posts 18 so that, when the hinges are fully open, the posts will be held perpendicular to the base with their lower ends in firm contact with its top surface; and when these hinges are closed, the posts 18 will extend across the top surface of the base and lie parallel with it.

A cross plate 19 is secured to the upper ends of the posts 18 and the ends of this plate are recessed so the walls of the recesses engage two sides of each post. The upper ends of the metal posts 18 are split and portions of their sides turned down to form flanges 20 and 21 that are secured to the cross plate 19 by screws 22 so that the top ends of posts and ends of the plates are very rigidly secured together.

Wooden posts 23 provided with rack bars 24 are slidably mounted or telescoped into the upper ends of the metal posts 18; and their rack bars 24 are engaged by gears 25, 125 secured to a shaft 26 that is mounted in the strap bearings 27 attached by screws 28 to the cross plate 19. In other words these parts are so arranged that when the shaft 26 is rotated in either direction the wooden posts 23 will be either raised or lowered.

As best shown in Figs. 1, 6 and 8 the metal posts 18 are provided with slots 118 through which the gears 25, 125 extend to engage their respective rack bars 24.

The shaft 26 is rotated in either direction by a hand wheel 29 that is provided with the usual handle 30; and the shaft 26 is locked from rotation by a latch 31 pivoted on the screw pin 32 arranged so that gravity will cause its heavy end to fall and engage the stop 33 with the teeth of the gear 25. When the handle end 34 of the latch 31 is manually depressed the stop 33 will be lifted to disengage the teeth of the gear 25, as indicated by dotted lines in Fig. 7, and when the latch is so actuated the shaft 26 can be rotated as stated.

The top ends of the posts 23 are connected by end plate 35 to which a pair of hinges 36 is secured and arranged so that the pivot pins of the hinges are off-set at a right angle to the plate and extend forward in advance of the stand.

The other wings of the hinges 36 are secured to the bottom side of the camera platform 37 at its forward end so the platform can be supported in the positions shown in Figs. 1, 2 and 12 or turned down so its lies parallel with the posts 23, as shown in its folded position in Figs. 4 and 5.

Preferably the platform is provided with a felt cloth cover 38; and also an attachment screw 49 by which a camera 50 is detachably secured to the platform.

The camera 50 is fragmentally indicated by dotted lines in Figs. 1 and 2, as secured to the platform by the screw 49. The covering 38 and screw 49 are old in the art and are therefore not shown or described in detail; and also it is understood that any suitable camera may be mounted on the platform.

The rear end of the platform 37 is supported by a brace 51 that is adjustable so that the rear end of the platform can be moved in an arc either up or down to tilt the camera 50.

The lower end 52 of the brace is pivotally mounted on a rod 53 that extends crosswise to the stand and has its ends secured to the ends of the elongated wings of the hinges 54. The hinges 54 are secured to the posts 23 and move with them when they are raised or lowered.

In other words the brace 51 is not only pivoted on the rod 53 but also the rod is hinged so it has considerable arc movement to permit a full adjustment of the rear end of the platform, and is also so arranged that the apparatus can be folded.

The other end of the brace 51 is provided with a hand screw 55 that is adapted to move the screw bolt 56 to either raise or lower the rear end of the platform 37. The screw bolt 56 has a head 57 detachably connected by a pin 58 to a bracket 59 on the underside of the platform 37.

The operation of the hand screw 55 to move the screw bolt 56 endwise to lengthen or shorten the brace 51 and thereby raise or lower the rear end of the platform 37 is illustrated in Fig. 12, in which the parts are shown in three positions.

Also a downwardly and rearwardly extending brace 60 is provided for holding the posts 18 in a substantially rigid and erect position when the stand is erected ready for use. This brace includes the guide bars 61 that are spaced apart by the upper plates 62 and lower bracket 63 so that a center bar 64 is slidably arranged between them. The bars 61 have their upper ends connected by hinges 65 to the cross plate 19 and their lower ends are pinched against the center bar by a screw 66 to hold it in adjusted position.

The upper end of the center bar 64 is free and its lower end is detachably connected to the base 15 by a bolt and bracket 67 and 68 respectively. It is obvious that when the screw 66 is loosened the center bar 64 can be adjusted one way or the other between the guide bars 61 to rigidly hold the posts 18 in an upright position or to collapse and fold the braces as best indicated in Figs. 4 and 5.

In order to strengthen the structure and make the posts 18 more rigid I provide cross braces 69 between them, as best shown in Figs. 1 and 5.

In operation the stand is erected and made rigid as described. Then the hand wheel 29 is manipulated to raise and lower the platform 37 to the right elevation; and also the hand screw 55 can be actuated if necessary to tilt the platform as described. Also the whole stand can be turned on the caster wheels in either direction to move the camera into the right position for operation.

Then, with the parts properly adjusted, the camera can be operated in the usual way without being affected by vibration. In other words when the camera-stand is erected and in use it is not easily affected by ordinary jars or shocks such as would vibrate the lens a sufficient amount to seriously affect the pictures.

It is obvious that the camera-stand can be folded down into a compact bundle, easily transportable, as shown in Figs. 4 and 5.

It is also obvious that the stand can be constructed of any suitable material and in various sizes for various uses.

I claim as my invention:

1. A camera stand including a base, caster wheels supporting said base so the stand can be moved from place to place and turned in arcs to aid in focusing a camera thereon toward an object, hollow metal posts secured to said base, movable posts having their lower ends extended into the upper ends of said metal posts, a camera platform supported at the front on the upper ends of said movable posts, an adjusting means including a hand wheel for raising and lowering said platform, a latch for holding said platform in adjusted position, and other means pivotally connected to said movable posts for tilting the rear end of said camera platform to aid in focusing a camera.

2. A camera stand including a triangular base, caster wheels arranged under the corners of said base so the stand can be moved from place to place or turned in arcs to aid in focusing a camera thereon toward a scene or object, hollow metal posts pivotally connected to said base, an adjustable post brace for normally holding said posts perpendicular to said base, movable posts having their lower ends extending into the top ends of said metal posts, rack bars on said movable posts, a shaft supported adjacent the upper ends of said metal posts, gears on said shafts extending through slots in said metal posts to engage the teeth of said rack bars, a camera platform pivotally connected to the upper ends of said movable posts, a hand wheel for rotating said shaft to raise and lower said platform, and a latch for engaging the teeth of one of said gears to hold said platform in adjusted position.

3. A camera stand including a triangular base, caster wheels arranged under the corners of said base so the stand can be moved from place to place or turned in arcs to aid in focusing a camera thereon toward a scene or object, hollow metal posts pivotally connected to said base, an adjustable post brace for normally holding said posts perpendicular to said base, movable posts having their lower end sextending into the top ends of said metal posts, rack bars on said movable posts, a shaft supported adjacent the upper ends of said metal posts, gears on said shafts extending through slots in said metal posts to engage the teeth of said rack bars, a camera platform pivotally connected to the upper ends of said movable posts, a hand wheel for rotating said platform, a shaft to raise and lower said platform, a latch for engaging the teeth of one of said gears to hold said platform in an adjusted position, a platform brace pivotally connected to said movable posts that is extended upwardly and rearwardly to support the rear end of said platform, and a hand screw adjacent the upper end of said platform brace for moving the rear end of said platform in an arc to aid in adjusting a camera thereon into a proper focusing position.

4. In a collapsible camera stand the combination with a triangular skeleton base, a platform having front and rear ends, an adjustable collapsible supporting means interposed between said base and platform, said means including a pair of hollow posts secured to said base and a pair of corresponding posts pivotally secured to the front end of said platform and slidably mounted in the upper ends of said hollow posts, of a cross rod having its ends connected by hinges to said sliding posts, a brace having one end pivotally connected to said cross rod, a screw bolt detachably connected to the rear end of said platform, and a hand screw connecting said screw bolt to the other end of said brace whereby said brace can be lengthened or shortened to tilt said platform.

5. In a collapsible camera stand the combination with a triangular skeleton base with caster wheels at the corners thereof so it can be moved from place to place or turned in arcs to focus a camera on said stand, a pair of hollow metal posts having their lower ends secured by hinges to opposite corners of said base, a collapsible brace for holding said base, in a vertical position on said base, movable posts having their lower ends extended into the upper ends of said metal posts, a camera platform having its front end connected by hinges to the upper ends of said movable posts, an adjustable brace pivotally connected to said movable posts for supporting the rear end of said platform, of means for moving said platform toward or away from said base, said means including a gear and rack bar connection between the hollow and movable posts, a hand wheel for rotating said gears to move said rack bars, and a latch for engaging said gears for the purpose specified.

In witness whereof, I have hereunto affixed my signature.

FRANK E. ROSHNELL.